United States Patent
Kazmierczak et al.

(10) Patent No.: US 7,505,754 B2
(45) Date of Patent: Mar. 17, 2009

(54) DEPLOYMENT OF VEHICLE SAFETY RESTRAINT VIA WIRELESS TRIGGER SIGNAL

(75) Inventors: Harald Kazmierczak, Beilstein (DE); Harald Tschentscher, Grossbottwar (DE); Hartmut Schumacher, Freiberg (DE); Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 236 days.

(21) Appl. No.: 10/539,916

(22) PCT Filed: Jun. 4, 2003

(86) PCT No.: PCT/DE03/01849

§ 371 (c)(1),
(2), (4) Date: Nov. 14, 2005

(87) PCT Pub. No.: WO2004/056616

PCT Pub. Date: Jul. 8, 2004

(65) Prior Publication Data

US 2006/0148445 A1 Jul. 6, 2006

(30) Foreign Application Priority Data

Dec. 19, 2002 (DE) .................. 102 59 546

(51) Int. Cl.
*H04M 11/04* (2006.01)
(52) U.S. Cl. .................. 455/404.1; 455/412.2; 280/735; 340/539.18; 701/36; 710/100

(58) Field of Classification Search .................. 280/735
See application file for complete search history.

(56) References Cited

U.S. PATENT DOCUMENTS

| | | | | |
|---|---|---|---|---|
| 3,668,627 A | * | 6/1972 | Brainerd | 280/735 |
| 5,041,817 A | * | 8/1991 | Reeb | 340/635 |
| 5,232,243 A | * | 8/1993 | Blackburn et al. | 280/732 |
| 5,629,678 A | * | 5/1997 | Gargano et al. | 340/573.4 |
| 5,810,606 A | | 9/1998 | Rupert et al. | |
| 5,856,710 A | * | 1/1999 | Baughman et al. | 307/10.1 |
| 5,957,988 A | * | 9/1999 | Osajda et al. | 701/45 |
| 6,067,302 A | * | 5/2000 | Tozuka | 370/464 |
| 6,253,131 B1 | * | 6/2001 | Quigley et al. | 701/36 |
| 6,260,086 B1 | * | 7/2001 | Butler et al. | 710/100 |
| 6,438,466 B1 | * | 8/2002 | Voigtlaender et al. | 701/1 |
| 6,441,511 B1 | * | 8/2002 | Masudaya | 307/10.1 |
| 6,466,613 B1 | * | 10/2002 | Raphaeli et al. | 375/219 |
| 6,515,377 B1 | * | 2/2003 | Ubelein et al. | 307/10.1 |

(Continued)

FOREIGN PATENT DOCUMENTS

EP 0 502 608 9/1992

*Primary Examiner*—Duc Nguyen
*Assistant Examiner*—Hai V Nguyen
(74) *Attorney, Agent, or Firm*—Kenyon & Kenyon LLP

(57) ABSTRACT

A device for wireless transmission of a deployment signal. The device includes two processors on both the primary side and the secondary side, which exchange data with one another. A high degree of redundancy is thereby achieved. The wireless transmission is preferably carried out as inductive transmission.

7 Claims, 2 Drawing Sheets

U.S. PATENT DOCUMENTS

| | | | |
|---|---|---|---|
| 6,805,375 B2 * | 10/2004 | Enders et al. | 280/735 |
| 6,822,551 B2 * | 11/2004 | Li et al. | 340/5.1 |
| 6,931,470 B2 * | 8/2005 | Ballantyne et al. | 710/107 |
| 6,937,137 B1 * | 8/2005 | Giehler et al. | 340/5.61 |
| 6,961,560 B2 * | 11/2005 | Hermann et al. | 455/414.1 |
| 6,988,026 B2 * | 1/2006 | Breed et al. | 701/29 |
| 7,030,777 B1 * | 4/2006 | Nelson et al. | 340/933 |
| 7,413,129 B2 * | 8/2008 | Fruhauf | 235/492 |
| 2002/0089307 A1 * | 7/2002 | Yang | 320/116 |
| 2002/0167399 A1 * | 11/2002 | Enders et al. | 340/438 |
| 2003/0064748 A1 * | 4/2003 | Stulberger | 455/556 |
| 2003/0154336 A1 * | 8/2003 | Ballantyne et al. | 710/110 |
| 2003/0222758 A1 * | 12/2003 | Willats et al. | 340/5.72 |
| 2004/0249571 A1 * | 12/2004 | Blesener et al. | 701/301 |
| 2005/0197106 A1 * | 9/2005 | Bristow et al. | 455/412.2 |
| 2006/0116803 A1 * | 6/2006 | Armbruster et al. | 701/48 |
| 2006/0126901 A1 * | 6/2006 | Mattes et al. | 382/104 |
| 2006/0202819 A1 * | 9/2006 | Adamczyk et al. | 340/539.18 |
| 2006/0292991 A1 * | 12/2006 | Abramov et al. | 455/63.4 |

* cited by examiner

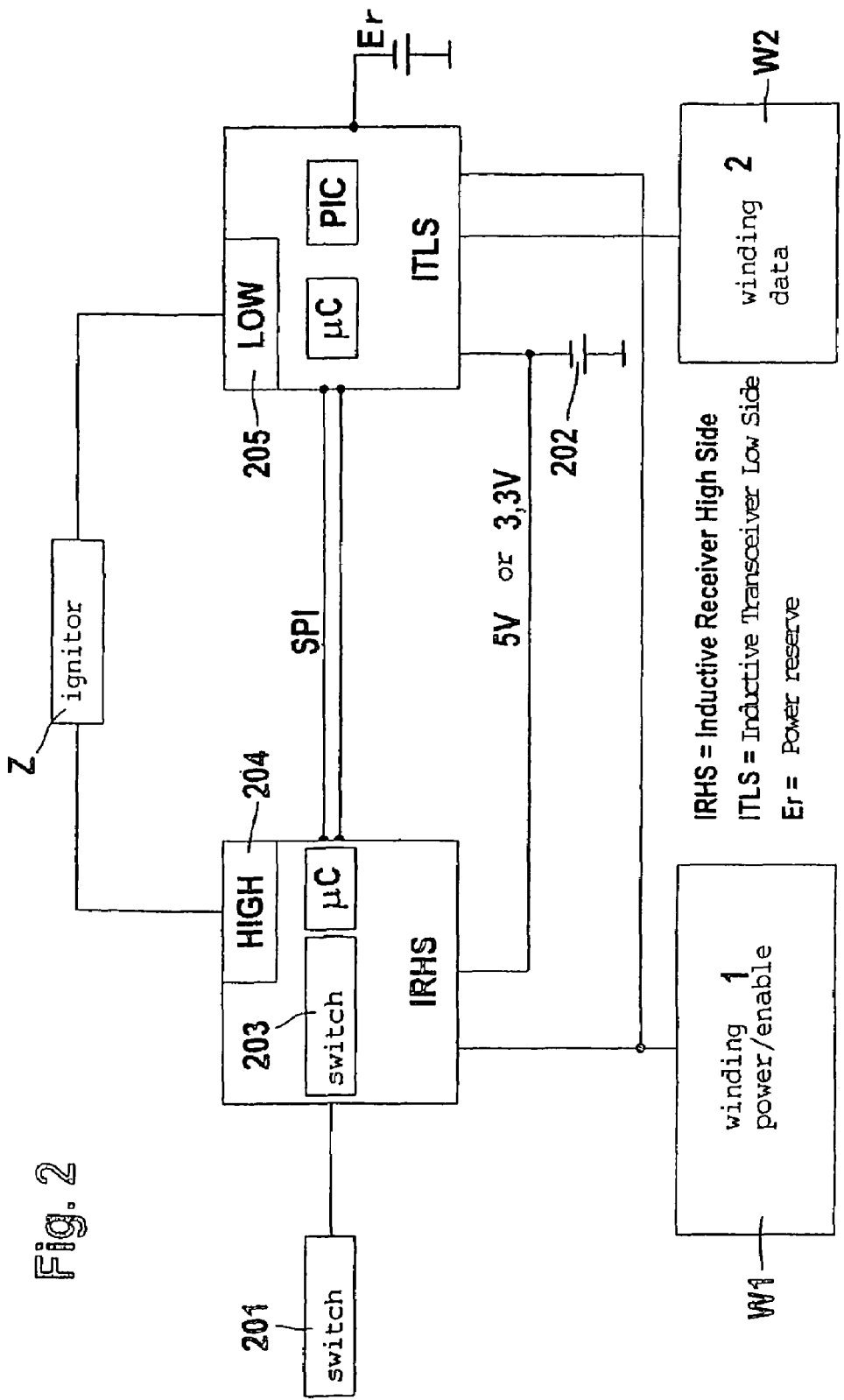

DEPLOYMENT OF VEHICLE SAFETY RESTRAINT VIA WIRELESS TRIGGER SIGNAL

FIELD OF THE INVENTION

The present invention is directed to a device for wireless transmission of a deployment signal.

BACKGROUND INFORMATION

German Patent Application No. DE 100 46 695 describes a device for wireless transmission of a deployment signal, which transmits the deployment signal over a first path and a redundance signal for the deployment signal over a second path. Deployment then occurs on the secondary side only if both the deployment signal and the redundance signal are recognized on the secondary side.

SUMMARY

An example device according to the present invention for wireless transmission of a deployment signal may have the advantage over the related art that there are two processors on both the primary side and the secondary side, these processors being configured in such a way that they exchange data with one another. A high degree of redundancy is thus achieved on the primary and secondary sides, resulting in reliable deployment of the restraining means such as an airbag or a seat belt tightener. The redundance signal and the deployment signal may be analyzed separately.

It may be particularly advantageous if the primary side is situated in a steering column and the secondary side is situated in the steering wheel. The device according to the present invention is then suitable for wireless transmission of a deployment signal for an airbag in a steering wheel.

It may be furthermore advantageous if the primary side is situated in the vehicle chassis and the secondary side is situated in a vehicle seat. The device according to the present invention is then particularly well-suited for removable seats for which wireless, in particular inductive, transmission is particularly well-suited.

It may be furthermore advantageous if a first transceiver for wireless transmission is situated on the primary side and is connected to the two processors situated on the primary side, and on the secondary side a first transceiver block having a first processor is connected to a first terminal of a triggering element and a second transceiver block having a second processor is connected to a second terminal of the triggering element. The transceiver is responsible for the conversion of the signals to be transmitted with respect to frequency and amplitude. The two transceiver blocks are situated on the secondary side for connecting a block to the high side and the low side of the triggering element.

It may be furthermore advantageous if the first transceiver block receives the redundance signal via a first winding, and the second transceiver block receives the deployment signal via a second winding. The first winding may be assigned to a power transmitter, and the second winding may be assigned to a data transmitter. As an alternative, it is possible to use a single transmitter having two windings on the secondary side. Electrical filtering may also be provided for separating the deployment signal from the enable signal.

Finally, it may be also advantageous if the first transceiver block generates a supply voltage and closes the high-side switch when deployment occurs, while the second transceiver generates and monitors the power reserve and closes the low-side switch when deployment occurs.

BRIEF DESCRIPTION OF THE DRAWINGS

Exemplary embodiments of the present invention are illustrated in the figures and explained in greater detail in the description that follows.

FIG. 2 shows a block diagram of the secondary side of the example device according to the present invention.

DETAILED DESCRIPTION OF EXAMPLE EMBODIMENTS

Figure 1:
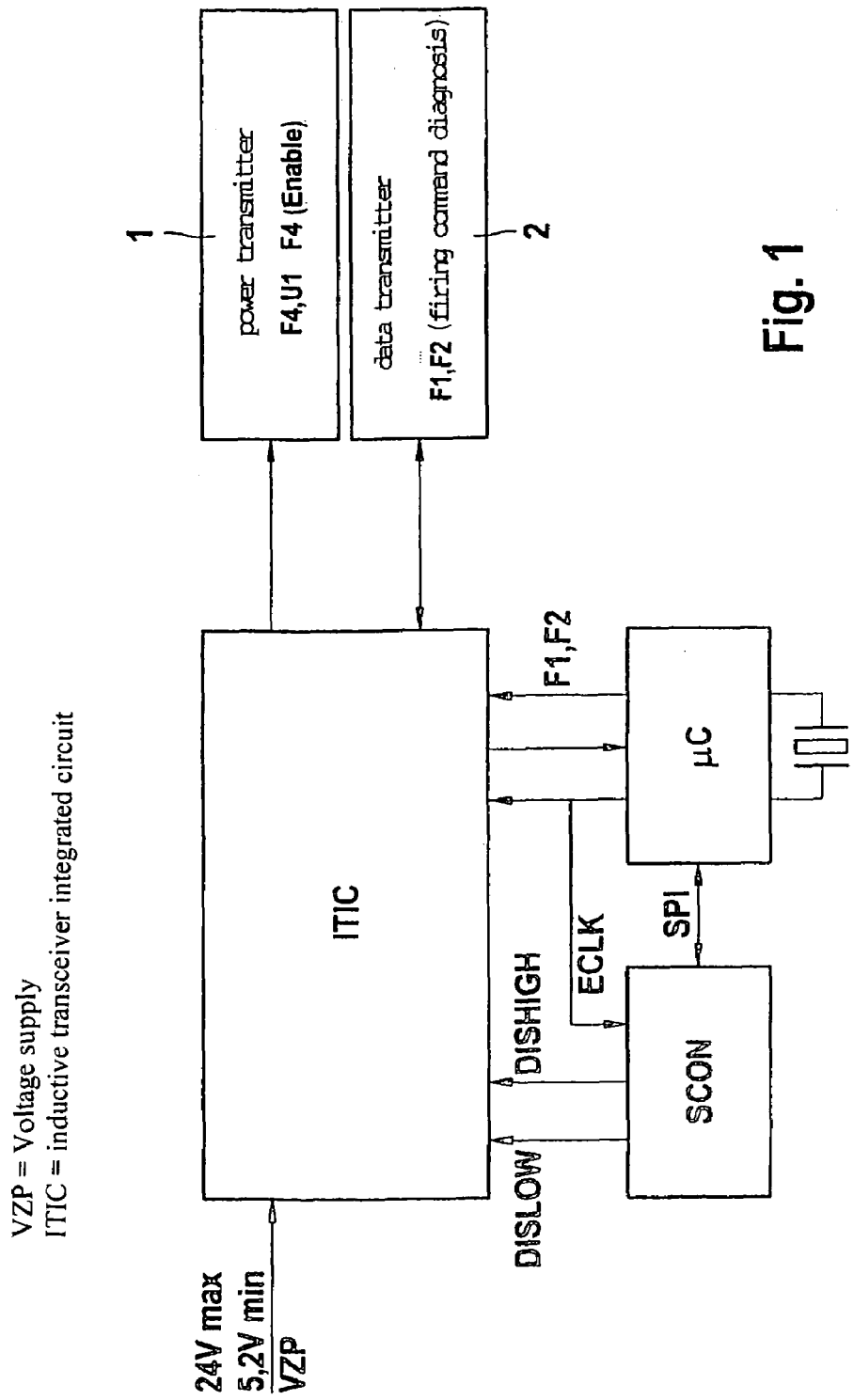
FIG. 1 shows a first block diagram of the primary side of an example device according to the present invention.

New airbag generations have a high degree of redundancy in their electronic systems. The microcontroller, as a processor, which performs the analysis and executes the deployment algorithm, is also connected to a safety semiconductor, which also inputs and independently checks the sensor data. Deployment of restraining means occurs only if this safety semiconductor also determines deployment, as long as this is also detected by the microcontroller. Various watchdog monitoring units and other safety structures may also be provided in the triggering circuit.

According to the present invention, the redundancy of the processors, which is achieved using the safety semiconductor and the microcontroller, is extended to the secondary side. On the primary side, a transceiver is connected to the microcontroller and the safety semiconductor acting as the two processors, the transceiver being typically connected to a secondary side via two transmitters, one data transmitter and one power transmitter, the secondary side being situated in the steering wheel or in a removable seat, for example. The secondary side has a transceiver block on the high side and another transceiver block on the low side of the triggering element. A processor, connected to the other processor via a communication line, is situated in each transceiver block. Redundancy similar to that of the primary side may thus also be achieved on the secondary side by using the two processors.

FIG. 1 shows in a block diagram the primary side of the device according to the present invention. A transceiver ITIC is connected to a microcontroller μC and a safety semiconductor SCON via two data inputs each. Microcontroller μC is connected to safety semiconductor SCON via a line SPI. Furthermore, a data output of microcontroller μC is also connected to safety semiconductor SCON via a line ECLK. A line VZP for voltage supply is also connected to transceiver ITIC. Transceiver ITIC is connected to a power transmitter 1 via a first output and to a data transmitter 2 via an input/output. Power transmitter 1 and data transmitter 2 are both transformers.

Transceiver ITIC provides the voltage and frequency for power transmission, as well as the voltage and frequency for the enable signal in the redundancy path via power transmitter 1. Furthermore, transceiver ITIC contains an arrangement for data transmission via data transmitter 2. Such arrangement may include, suitable drivers, for example. Microcontroller μC outputs a deployment signal F1 and diagnosis signals F2 via transceiver ITIC. The responses to the diagnosis signals, which are transmitted back to transceiver ITIC by the secondary side via data transmitter 2, are then relayed to microcontroller μC, which then checks and determines the reliability performance of components, in particular of a triggering element. Safety semiconductor or safety controller SCON analyzes sensor signals simultaneously with microcontroller μC to detect a deployment situation. If controller SCON also detects a deployment situation, SCON transmits an enable signal to ITIC; if the safety semiconductor does not detect a deployment situation, controller SCON transmits no signal or a disable signal. The signals relayed by transceiver ITIC to the transmitter(s) are then relayed to the two secondary-side processors for analysis.

FIG. 2 shows a block diagram representing the structure of the secondary side of the device according to the present invention. A winding W1 of power transmitter 1 is connected to a transceiver block IRHS and another transceiver block ITLS. A winding W2 of data transmitter 2 is only connected to transceiver ITLS. Transceiver IRHS is connected to a switch 201 and a triggering element Z. Transceiver IRHS is connected to transceiver ITLS via a double line SPI (serial peripheral interface), i.e., a serial data line, enabling the two processors µC, situated in the transceiver blocks, to exchange data. The two transceiver blocks IHRS and ITLS are each connected to a power source 202, here a voltage source. Transceiver ITLS is also connected to the ignitor, specifically to the low side, as well as to a power reserve ER, which is directly connected to a power IC (power semiconductor) in transceiver block ITLS. Transceiver block ITLS has a low-side switch 205, typically a transistor switch, which is closed in the event of deployment. Transceiver block IRHS has a high-side switch 204, which is also closed in the event of deployment to trigger triggering element Z, an ignitor, for example. Furthermore, transceiver block IRHS has an analyzer module 203 for detecting switching signals of switch 201.

Redundancy for improving bidirectional communication via line SPI is achieved on both primary and secondary sides via two microcontrollers µC. Microcontroller µC in transceiver block IRHS is used for reading steering wheel switch 201 and optionally from sensors. Furthermore, the supply voltage is generated here by power source 202 and the power transmitter, and high-side switch 204 is closed in the event of deployment. The power reserve in capacitor ER is generated and monitored in transceiver ITLS by component PIC (power IC), and low-side switch 205 is closed in the event of deployment. The PC in ITLS also organizes the data transmission to the primary side via winding W2. The processor in transceiver block IRHS analyzes the enable signal which is transmitted via winding W1. The enable signal indicates whether or not SCON has determined deployment. Processor µC in transceiver block ITLS analyzes the deployment command which is transmitted via data transmitter 2 and winding W2. If both processors in transceiver blocks IRHS and ITLS determine deployment based on the signals, only then is triggering element Z triggered by the closing of switches 204 and 205. For this purpose, either the power supply via winding W1 or power source 202 and, optionally, power reserve ER are used.

What is claimed is:

1. A device for wireless transmission of a deployment signal, the device being configured to transmit the deployment signal via a first path and a redundance signal to the deployment signal via a second path, the device comprising:
    a primary side including two processors configured to exchange data with one another;
    a secondary side in communication with the primary side, the secondary side including two processors configured to exchange data with one another; and
        wherein the primary side further includes a first transceiver configured for wireless transmission connected to the two processors of the primary side, and wherein the secondary side includes a first transceiver block, the first transceiver block including a first of the two processors of the secondary side, the first transceiver block being connected to a first terminal of a triggering element, and wherein the secondary side further includes a second transceiver block, the second transceiver block including a second one of the two processors of the secondary side, the second transceiver block being connected to a second terminal of the triggering element.

2. The device as recited in claim 1, wherein the primary side is situated in a steering column and the secondary side is situated in a steering wheel.

3. The device as recited in claim 1, wherein the primary side is situated in a vehicle chassis and the secondary side is situated in a vehicle seat.

4. The device as recited in claim 1, wherein the wireless transmission is configured as an inductive transmission.

5. The device as recited in claim 1, wherein the first transceiver block is configured to receive the redundance signal via a first winding, and the second transceiver block is configured to receive the deployment signal via a second winding.

6. The device as recited in claim 5, wherein the first winding is assigned to a power transmitter, and the second winding is assigned to a data transmitter.

7. The device as recited in claim 1, wherein the first transceiver block is configured in such a way that the first transceiver block generates a supply voltage and closes a high-side switch when deployment occurs, and the second transceiver block is configured in such a way that the second transceiver block generates and monitors a power reserve and closes a low-side switch when deployment occurs.

* * * * *